US012573252B2

(12) United States Patent
Gershman

(10) Patent No.: US 12,573,252 B2
(45) Date of Patent: Mar. 10, 2026

(54) SYSTEM OR METHOD TO DETECT OPENED OR CLOSED POSITION OF A DOOR LOCK IN EXISTING DOOR LOCK USING LOCK LATCH HANDLE POSITION

(71) Applicant: Vladimir Gershman, Newtown, PA (US)

(72) Inventor: Vladimir Gershman, Newtown, PA (US)

( * ) Notice: Subject to any disclaimer, the term of this patent is extended or adjusted under 35 U.S.C. 154(b) by 268 days.

(21) Appl. No.: 18/518,868

(22) Filed: Nov. 24, 2023

(65) Prior Publication Data

US 2025/0174062 A1 May 29, 2025

(51) Int. Cl.
*G07C 9/00* (2020.01)
*E05B 17/00* (2006.01)

(52) U.S. Cl.
CPC .......... *G07C 9/00571* (2013.01); *E05B 17/00* (2013.01)

(58) Field of Classification Search
CPC ............................ G07C 9/00571; E05B 17/00
See application file for complete search history.

(56) References Cited

U.S. PATENT DOCUMENTS 8,079,240 B2 * 12/2011 Brown ................ E05B 63/0056 70/279.1
2014/0267740 A1 * 9/2014 Almomani ......... G07C 9/00182 348/156
2016/0186463 A1 * 6/2016 Roatis ....................... E05C 3/12 70/266
2017/0198496 A1 * 7/2017 Beck ....................... E05B 17/22

FOREIGN PATENT DOCUMENTS

CA 2957856 A1 * 8/2018 ............. E05B 17/22

* cited by examiner

*Primary Examiner* — Yong Hang Jiang

(57) ABSTRACT

A device detects door lock's open or closed positions by using an electronic circuit mounted on the lock latch handle.

13 Claims, 3 Drawing Sheets

SYSTEM OR METHOD TO DETECT OPENED OR CLOSED POSITION OF A DOOR LOCK IN EXISTING DOOR LOCK USING LOCK LATCH HANDLE POSITION

This application claims priority benefit of U.S. Provisional Patent Application Ser. No. 63/602,275, filed Nov. 22, 2023, which is hereby incorporated by reference in its entirety.

BACKGROUND OF INVENTION

Field of Invention

This invention relates to field of housing security. A door with a deadbolt lock or a patio door lock may be closed, but not locked, leading to dangerous safety situations. This issue exists in the currently installed mechanical locks. The invention attaches to the existing lock latch handle and allows detecting the state of the lock using existing lock system and reporting it to a user via Wi-Fi-based message or e-mail.

Description of Prior Art

There is some prior art that includes monitoring deadbolt lock status, but most of them require replacing the old lock with the new one.

Other prior art has different embodiment and functionalities such as listed below:

a. It offers the solution that requires installing the sensor in a location different from the sensor processor location.
b. The presented embodiments do not offer practical steps that would allow realization of their invention. For example, they offer placing the sensor reader inside the lock, which is not a trivial part of a typical user installation.
c. The presented embodiments use a magnetic sensor. Given the lock's metal housing and metal installation structure, the magnetic sensor will be surrounded by metal. That makes it difficult to detect the sensor magnetic field levels. Also, the magnetic sensor requires close proximity to the processor, which can make the implementation impractical, requiring specific and accurate sensor placement.

Currently this problem is addressed commercially by using electronic locks. However, that means that one has to buy a new lock and replace the existing lock, which may not be feasible for many lock users.

There are hobbyist type solutions, but those are not simple to implement and do not do what the invention proposes.

This invention acts as "add-on" device mounted on the latch handle and allowing using an existing lock; it uses accelerometer type sensor to determine the lock status; it uses single sensor and processor system that allows for a single installation step; it addresses practical issues of low power, position detection accuracy, freedom of sensor placement.

Summary of Invention

The device in the invention consists of two major parts: the lock latch handle attachment and the electronic circuit enclosure with a circuit board. The electronic circuit enclosure is inserted into the latch handle attachment.

Every deadbolt lock or a patio lock have a latch handle that allows to close or open the lock. The invention's lock latch handle attachment fits onto the latch handle. The lock latch handle attachment has a mechanical structure that allows the electronic circuit enclosure to be attached to it.

The electronic circuit, that resides in the electronic enclosure, uses a microcontroller that reads accelerometer sensor data to obtain position of the latch handle to compute whether the latch handle is in a closed or open positions. If the computed latch handle position changes from the previous one, the microcontroller will turn on Wi-Fi processor, which will send out a Wi-Fi message in a form of email or SMS message to a user.

BRIEF DESCRIPTION OF THE DRAWINGS

The preferred embodiment and electronic design of the invention, which illustrates all its features is shown in the figures below. The figures demonstrate the novelty of the invention and are for illustrative purposes only. The drawings include the following figures (FIGS.) with like numerals indicating the like parts.

DETAILED DESCRIPTION OF THE INVENTION

Figure 1:
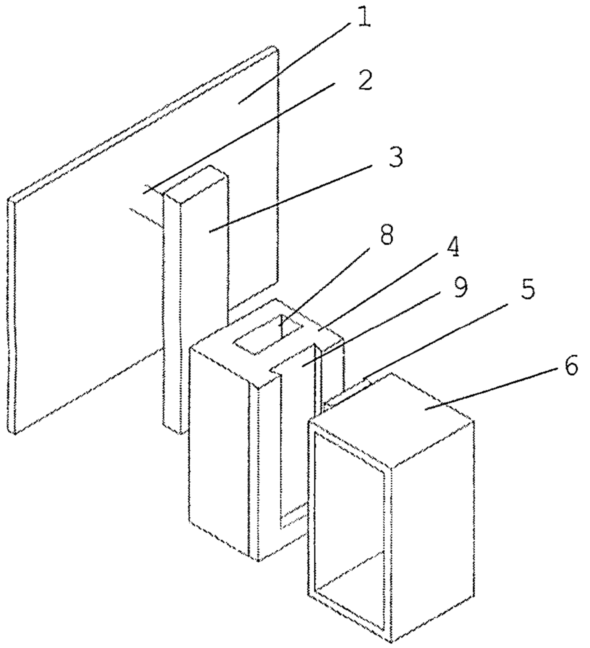
FIG. 1 is simplified perspective or isometric view of the disassembled device as it is placed with respect to the lock latch handle of the door.

As shown in FIG. 1, the device consists of latch handle attachment 4 and PCB case 6. PCB case 6 has a dovetail extrusion 5 that fits into the dovetail 9 in the latch handle attachment 4. This allows easy removal of the PCB case 6 if, for example, batteries need to be replaced. Cavity 8 is used mount the device onto the latch handle 3. FIG. 1 shows dissembled view of the device as not attached to the latch handle yet.

Figure 2:
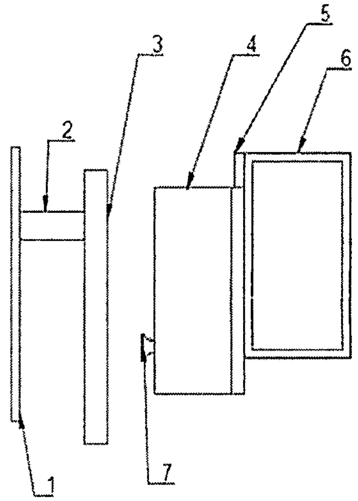
FIG. 2 is a cross assembly view FIG. 1 of the device.
Figure 3:
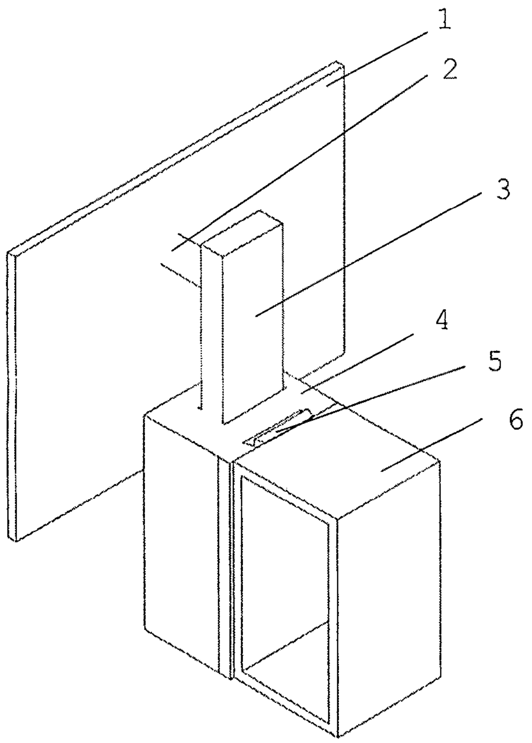
FIG. 3 is simplified perspective or isometric view of the assembled and installed device depicting its major components and how they are mounted.

As shown in FIG. 3, in its operational state, the latch handle attachment 4 is inserted onto door handle 3 and secured with set screw 7 shown in FIG. 2. The lock latch handle 3 attaches to the door 1 via some support 2. The door 1 and support 2 are not part of the invention and are shown for clarity of the device installation.

Figure 4:
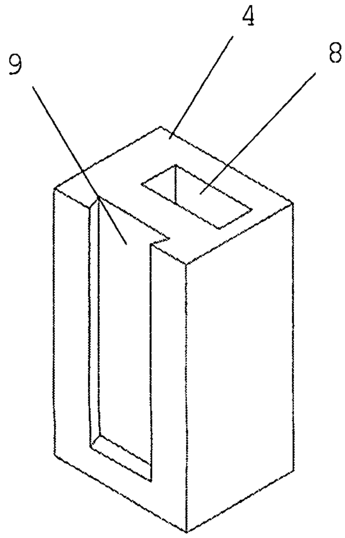
FIG. 4 is a close-up view of the lock latch handle attachment showing the dovetail grove, latch handle insertion hole and its set screw.
Figure 4A:
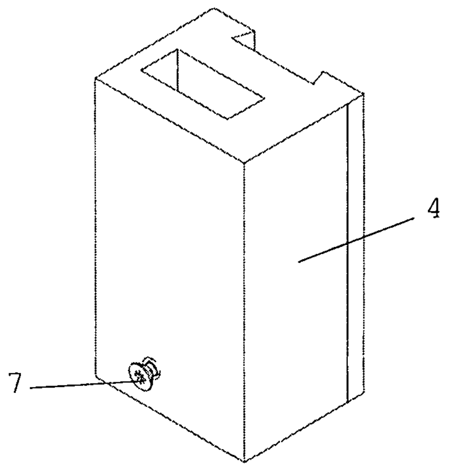

FIG. 4 clarifies the location of dovetail cavity 9 and the latch handle cavity 8 in the latch handle attachment 4. The set screw 7 shown in FIG. 4A is used to secure latch handle attachment 4 on the latch handle 3. It is understood by those skilled in the field, that the latch handle 3 configuration may vary from one lock vendor to another, thus the design of the cavity 8 and location of the set screw 7 may vary.

Figure 5:
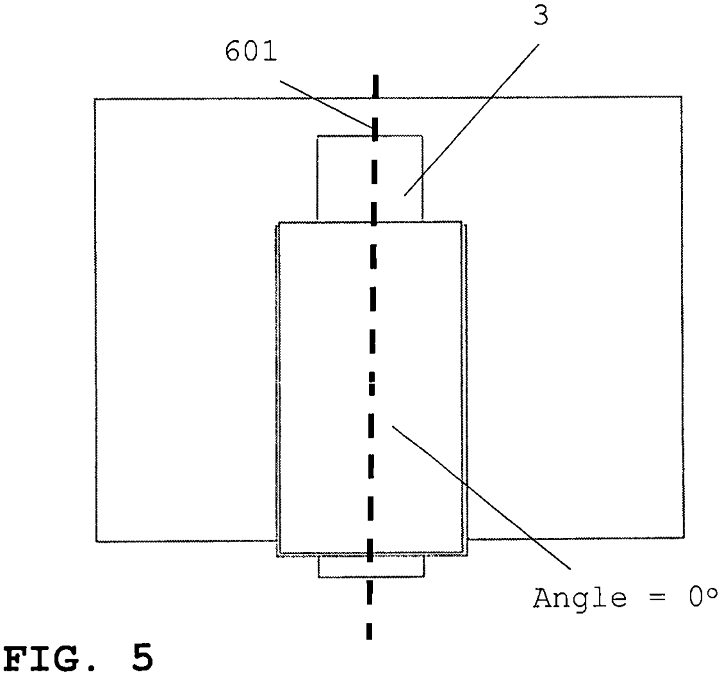
FIG. 5 shows position of the latch handle when the lock is in locked position.

FIG. 5 shows the latch handle 3 in locked position. This happens when vertical line 601 is collinear with the vertical center line of the latch handle 3 and the installed device and the angle is zero.

Figure 6:
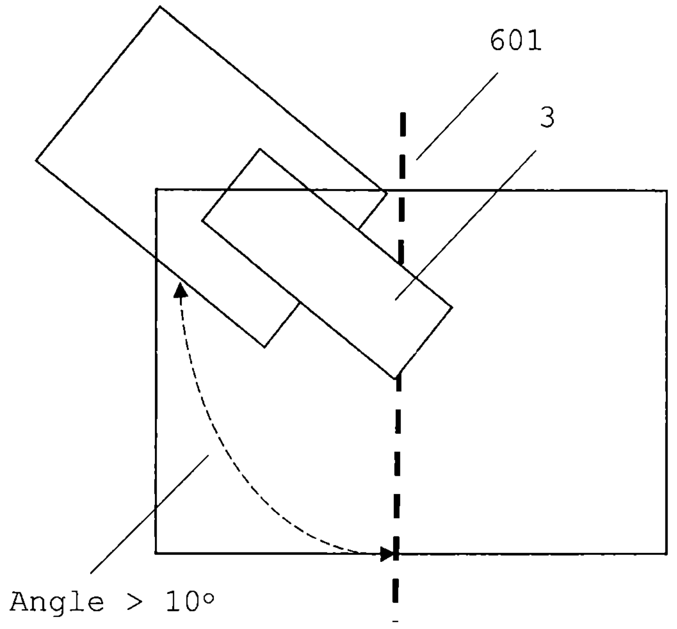
FIG. 6 shows position of the latch handle when the lock is in unlocked position.

FIG. 6 shows the unlocked state when the latch handle 3, the latch handle attachment 4 with the PCB case 6 were moved counterclockwise at the angle greater than 10 degrees with the vertical line 601. It is understood by those skilled in the field, that the position indicating locked state may vary from one lock vendor another and would have to be adjusted if the locked and unlocked state angle changes.

Figure 7:
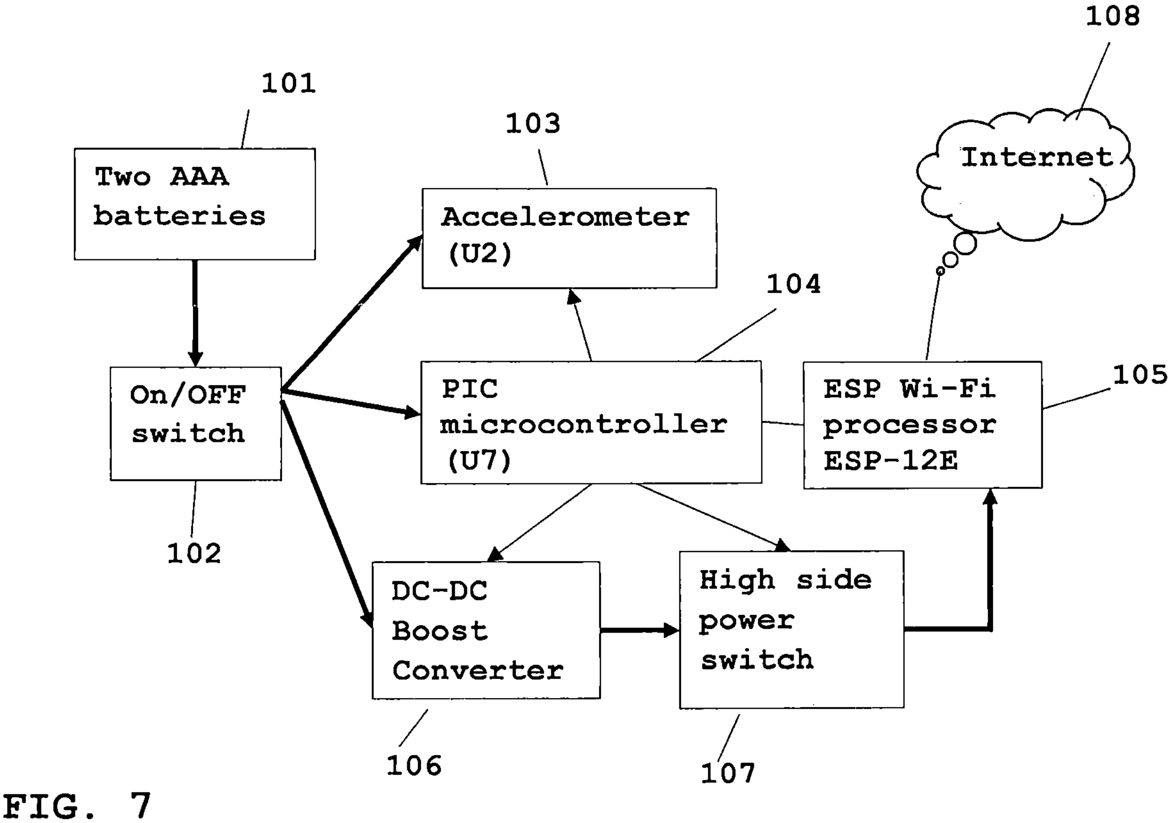
FIG. 7 shows high level diagram of an electronic circuit implementing the device functionality.

The details of the device electronics operation are shown in FIG. 7. In the shown embodiment the device uses two AAA batteries 101. It is understood by those skilled in the field, that other batteries types can be used.

As shown in FIG. 1, before turning on the device, the latch handle attachment 4 is inserted onto the latch handle 3 via cavity 8 and secured with the set screw 7 shown in FIG. 2. Then, as shown in FIG. 1, PCB case dovetail extrusion 5 slides into the dovetail cavity 9 in the latch handle attachment 4. As shown in FIG. 7, after the on/off switch 102 is turned on, the microcontroller 104 computer program sets its clock to 8 MHz to allow communicating with accelerometer 103 and read the lock position coordinates. Then microcontroller 104 computer program enables DC-DC boost converter 106 and the high side power switch 107 in order to power up Wi-Fi processor 105. Then microcontroller 104 computer program sends the data to Wi-Fi processor 105. Wi-Fi processor 105 own computer program computes whether the lock state is locked or unlocked and then sends that information out as email or SMS message via internet 108 to a user. Then microcontroller 104 computer program puts it into low power mode by disabling DC-DC boost converter 106 and the high side power switch 107 and changing from 8 MHz to 32 KHZ clock. 32 KHZ clock allows the microcontroller 104 to run at low power. The accelerometer 103 runs in low power SLEEP mode.

When the latch handle 3 moves up as shown in FIG. 6 or down as shown in FIG. 5, as shown in FIG. 7, the accelerometer 103 wakes up from SLEEP mode and issues an interrupt signal, which is detected by the microcontroller 104 computer program. Upon receiving the interrupt, the microcontroller 104 computer program switches to 8 MHz clock to be able to run 12C protocol and be able to query the accelerometer 103 about what position it is reading. If the accelerometer 103 reads the position different from the old one, the microcontroller 104 will send this data to Wi-Fi processor 105, otherwise the microcontroller 104 does not send out any data.

As shown in FIG. 7, when Wi-Fi processor 105 computer program receives the data via 12C protocol, it will evaluate whether the lock is locked or unlocked and send that information to user's email or message server via internet 108. This is a known operation for those skilled in email software design and will not be discussed in details here.

What I claim as my invention is:

1. A device that detects opened or closed position of a door lock in existing door locks by using a combination of a lock latch handle attachment and electronic circuit, where the electronic circuit uses a microcontroller to read accelerometer data to detect the lock positions and uses Wi-Fi processor to send out the lock status via email or SMS and the device comprising:

a microcontroller circuit that uses a computer program to read accelerometer sensor data and report the data to Wi-Fi processor;

a Wi-Fi processor circuit that uses a computer program to read the data from the microcontroller and send them to a user via email or SMS message;

an accelerometer circuit that detects position of the lock latch handle;

a computer program that runs on the microcontroller implementing an algorithm to read the accelerometer data and to filter out spurious or stale data;

a computer program that runs on the Wi-Fi processor and reads the microcontroller data and creates a message that reports to a user via email or SMS whether the lock is opened or closed and whether a battery voltage is within operational range;

a latch handle attachment that is mounted on the latch handle and allows attaching to the latch handle an enclosure that contains the electronic circuit;

the enclosure that allows non-permanent attachment to the latch handle attachment with the enclosure containing the electronic circuit.

2. The device of claim 1, wherein microcontroller operates as I2C slave device to report data via I2C protocol to Wi-Fi processor.

3. The device of claim 1, wherein microcontroller also operates as a I2C master device to read data from the accelerometer.

4. The device of claim 1, wherein microcontroller uses special algorithm to detect a unique state to avoid sending out duplicate alarms.

5. The device of claim 1, wherein special attachment is used to allow attaching electronic enclosure to the latch handle.

6. The device of claim 1, wherein Wi-Fi processor is used to report status to a user via Internet.

7. The device of claim 1, wherein a low power circuit is used to allow operation from 2 AAA batteries over a 1 year or longer with continuous accelerometer monitoring.

8. The device of claim 1, wherein one low and one high clock frequencies are used to operate in low and high-power consumption mode.

9. The device of claim 1, wherein boost dc-dc converter is used to allow operation from 3.3V down to 2V.

10. The device of claim 1, wherein a high side switch is used to shutdown Wi-Fi processor to keep it powered off during low power mode operation.

11. The device of claim 1 that can detect lock status in any existing door structure that has lock latch handle, including: patio door lock or deadbolt lock.

12. The device of claim 1, wherein the electronic enclosure is attached non-permanently.

13. The device of claim 1, wherein the position sensor and the accelerometer sensor are housed in the same enclosure and require single installation.

* * * * *